United States Patent [19]

Nishio et al.

[11] Patent Number: 5,035,847

[45] Date of Patent: Jul. 30, 1991

[54] MOLD FOR SLIP CASTING

[75] Inventors: Hiroaki Nishio; Takeshi Kawashima, both of Tokyo, Japan

[73] Assignee: Nippon Kokan Kabushiki Kaisha, Tokyo, Japan

[21] Appl. No.: 652,239

[22] Filed: Feb. 5, 1991

Related U.S. Application Data

[62] Division of Ser. No. 192,224, May 10, 1988, abandoned.

[30] Foreign Application Priority Data

Jun. 12, 1987 [JP] Japan ............................... 62-145326

[51] Int. Cl.[5] ............................................ C04B 33/28

[52] U.S. Cl. ........................................ 264/86; 249/61; 249/62; 249/134; 264/317; 419/40; 419/66

[58] Field of Search ........................... 249/134, 61, 62; 419/40, 66; 264/86, 317

[56] References Cited

U.S. PATENT DOCUMENTS

| | | | |
|---|---|---|---|
| 1,087,974 | 2/1914 | Owen | 249/134 |
| 4,127,629 | 11/1978 | Weaver et al. | 264/63 |
| 4,604,141 | 8/1986 | Natori | 249/134 |
| 4,731,208 | 3/1988 | Nakajima et al. | 264/344 |
| 4,737,332 | 4/1988 | Mayashita et al. | 264/344 |
| 4,820,462 | 4/1989 | Nakajima et al. | 264/63 |
| 4,871,497 | 10/1989 | Natori et al. | 419/40 |

FOREIGN PATENT DOCUMENTS

| | | |
|---|---|---|
| 191409 | 8/1986 | European Pat. Off. . |
| 190811 | 10/1984 | Japan . |

*Primary Examiner*—James Derrington

*Attorney, Agent, or Firm*—Frishauf, Holtz, Goodman & Woodward

[57] ABSTRACT

A mold for slip casting comprising a compact formed out of a mixture having an organic matter and powders, the organic matter being capable of being extracted by supercritical fluid and the powders being incapable of being extracted by the supercritical fluid, and furthermore, a method for slip casting comprising a compact formed out of an organic matter capable of being extracted by supercritical fluid and having a melting point of 0° to 150° C. The organic matter is any one selected from the group of methyl carbonate, t-butyle alcohol, stearic acid stearyl alcohol and paraffin.

23 Claims, 1 Drawing Sheet

MOLD FOR SLIP CASTING

This application is a division of application Ser. No. 192,224, filed May 10, 1988, now abandoned.

BACKGROUND OF THE INVENTION

1. Field of the Invention

The present invention relates to a mold for slip casting to obtain a compact by means of casting slip.

2. Description of the Prior Arts

The method for slip casting is roughly classified into two, depending on the way of solidifying slip. One method uses a mold having a feature of absorbing liquid and comprising gypsum ,or porous resin, wherein a part of liquid content in the slip which is cast into this mold is absorbed in the mold to give a feature of maintaining a shape to the slip and then to form a compact by disassembling the mold. Another one uses a mold having a feature of not absorbing liquid and comprising metal, rubber or the like. In this method, the mold is cooled down to the melting point temperature of the liquid contained in the slip or less in advance to cast the slip into the mold, or the slip is firstly cast into the mold at room temperature and thereafter the mold is cooled down to the melting point temperature of the liquid or less, and then, the liquid is solidified to give the feature of maintaining a shape to the slip. The compact is thus prepared by disassembling the mold.

According to those methods mentioned above, when a hollow compact having a complicated inside shape, i.e. one requiring a core being too complicated and hard in shape to be drawn out of the mold because the slope is open toward the inside, the core has to be given a drawing slope so as to make it easy to draw out the core. For this reason, contrivance such as making a core composed of divisible parts is adopted. But, some drawbacks take place, for example, a hollow shape of the core has to be limited, or assembling of the divisible parts becomes difficult. Another method is considered, wherein a core is made of gypsum, and the core is broken after the completion of a compact, but the compact is easy to crack or chip during the work of breaking the core.

Furthermore, in a Japanese Patent Application Laid Open No. 190811/84 a method of using a gypsum mold containing an organic matter insoluble in water by making use of water as a dispersion medium, is disclosed. This mold features lowering its own strength by absorption of moisture to break down of itself, and resultantly this method facilitates the work of demolding the mold. In this point, this method has an effect, in particular, on application to a mold having a complicated shape. The biggest disadvantage of this method is that this mold cannot be applied to metal powders and non-oxide ceramic powders having no affinity to water, and the coverage of the usage is so limited.

SUMMARY OF THE INVENTION

The object of the present invention is to provide a mold for slip casting applicable to whatever shape the mold has and still applicable not only to oxide ceramic powders, but also to non-oxide powders.

To attain the object, in accordance with the present invention, a mold for slip casting is provided, comprising a compact which is formed out of a mixture of an organic matter and powders, the organic matter being capable of being extracted by supercritical fluid and having a melting point of 0° to 150° C. and the powders being incapable of being extracted by the supercritical fluid.

Furthermore, a mold for slip casting which is formed out of an organic matter capable of being extracted by means of supercritical fluid and having a melting point of 0° to 150° C.

DESCRIPTION OF THE PREFERRED EMBODIMENT

Figure 1:
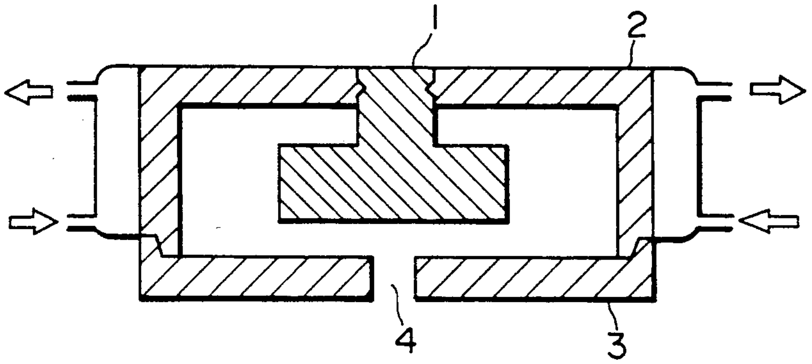
FIG. 1 is an elevational view in section showing a mold for slip casting of Example-1 according to the present invention.

A supercritical fluid in this specification means a fluid of a critical pressure and more, and still a critical temperature and more. Because the supercritical fluid has a density nearly equal to that of liquid, viscosity nearly to that of gas and diffusing power almost 100 times as large as that of liquid, the supercritical fluid can be made use of as an efficient solvent in comparison with a liquid solvent. As the supercritical fluid used in the present invention, a compound having a comparatively low supercritical temperature of 0° to 150° C. is preferable. The compound can be any one selected from the group consisting of ethane, ethylene, carbon dioxide, monochlorotrifluoromethane, trichloromonofluoromethane and ammonia.

As an organic matter capable of being extracted by means of the supercritical fluid, one having a melting point of 0° to 150° C. is preferable. An organic matter with a melting point of less than 0° C is hard to treat, because the organic matter is easy to melt at room temperature after a mold thereof is formed. On the other hand an organic matter having a melting point of more than 150° C. readily results in the formation of wrinkles on the surface of a compact during the forming process because the organic matter is required to be heated for raising the temperature of more than 150° C. in advance of slip casting. As an organic matter preferable to be used in the present invention is anyone selected from the group consisting of methyl carbonate, t-butyl alcohol, stearic acid, stearyl alcohol and paraffin.

A mixture having the above-mentioned organic matter and powders incapable of being extracted by supercritical fluid is formed into a compact, and the compact is used as a mold for slip casting. For the powders, metal powders and ceramic powders are preferable.

As the metal powders, powders of 1 to 1,000 μm in particle size having good flowability is preferable. For example, iron powders and iron alloy powders which are manufactured by means of a gas atomizing method are preferable. As ceramic powders, powders of 0.2 to 10 μm in particle size having good flowability are preferable. For example, silica and alumina can be mentioned.

Futhermore, it is preferable that a mixture of an organic matter and powders consists of 45 vol.% or less and exclusive of zero of the powders and the rest of the organic matter. The organic matter alone can be used instead of the mixture. If the ratio of the powders is of 45 vol.% or less, the mold breaks down of itself by means of extracting the organic matter supercritically. If the ratio is over 45 vol.% the mold is difficult to break down by itself. If the mixture is used, the amount of the organic matter can be decreased, compared with the case of the organic matter alone being used. So, the time for extraction can be shortened. It is recommendable that the formation of the mixture or of the organic matter alone is performed by means of press forming or cast forming.

The mold of a compact having the organic matter and the powders incapable of being extracted by means of the supercritical fluid or the mold having exclusively the organic matter capable of being extracted by means of the supercritical fluid can be prepared by the following methods:

(1) The whole mold is composed of a formed compact of the present invention; or (2) a part of the mold is composed of a formed compact of the present invention, and the rest of a formed compact having a feature of absorbing liquid or of not absorbing liquid, thereby those compacts being assembled into the mold. For the compact with the feature of absorbing liquid, gypsum or porous resin, and for the compact with the feature of not absorbing liquid, metal or rubber is used.

Metal powder or ceramic powder is dispersed into the liquid dispersion medium to prepare a slurry, the liquid dispersion medium being water, organic solvent an paraffin. As the organic solvent, methyl carbonate, t-butyl alcohol, methyl alcohol, ethyl alcohol, butyl alcohol, hexane and benzene are preferable. Paraffin having a melting point of 40° to 80° C. can be preferably used. When water is used as the dispersion medium, ceramic oxide such as alumina and zirconia is dispersed. When the organic solvent is used, in addition to the ceramic oxide, non-oxide ceramics such as silicon nitride, silicon carbide and aluminium nitride are dispersed. When the paraffin is used, ceramic oxide and non-oxide ceramics are dispersed.

The slurry thus prepared is cast into the mold formed in the manner as mentioned in the above. After a part of the dispersion medium is absorbed in the mold, or the dispersion medium is solidified, separable parts constituting the mold are taken away. Parts difficult to separate constituting the mold i.e. a core of a complicated shape is formed using an organic matter capable of being extracted by supercritical fluid contained in the core. A compact is formed by means of slip casting, and then, the compact is processed by a device for supercritical extraction, thereby the organic matter in the mold removed and the mold being melting away or breaking down by itself.

If a dispersion medium contained in the compact is formed out of an organic matter capable of being extracted, it is advantageous that in the process of the supercritical extraction, the removal of the dispersion medium in the compact is simultaneously performed. For the organic matter, methyl carbonate, t-butyl alcohol, methyl alcohol, ethyl alcohol, butyl alcohol, hexane and benzene can be preferably used. When a dispersion medium is not formed out of an organic matter capable of being extracted supercritically, the removal of the dispersion medium is conducted by the supercritical extraction together in combination with operation of heating and decomposition.

When the mold of the present invention is used, the mold melts away or breaks down by itself. Consequently, a hollow compact requiring such a complicated shaped core as to fail to be drawn out of the mold can be easily used. Moreover, when a main mold is prepared in accordance with the present invention, the main mold is not required to have a divisible consitution, and resultantly, a compact with precision in dimension can be obtained. Besides, a dispersion medium constituting slip is not necessarily limited to water, and therefore, a non-aqueous dispersion medium can be applied to molding not only ceramic powder, but also metal powders and non-oxide ceramic powers. Furthermore, if a dispersion medium in the compact is formed out of an organic matter capable of being extracted supercritically, the dispersion in the compact can be simultaneously removed.

EXAMPLE-1

Figure 2:
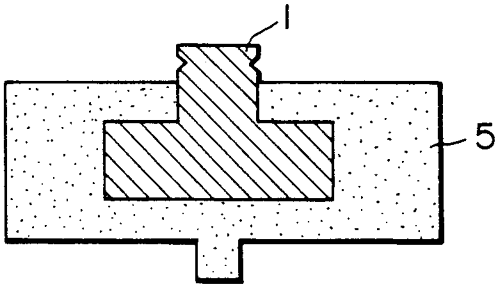
FIG. 2 is an elevational view in section showing a molded body with a core attached thereto of Example-1.
Figure 3:
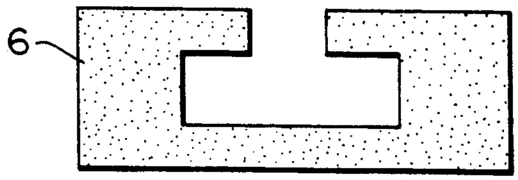
FIG. 3 is an elevational view in section showing a molded body finally produced of Example-1.

With specific reference to FIGS. 1 to 3 of the drawings, an example of the present invention will now be described.

Granular paraffin having a melting point of 42° to 44° C. was formed by hydraulic press into core 1 of a shape of a disc with a cylinder put thereon, the size of the disc being 30 mm in diameter and 10 mm in thickness and the size of the cylinder being 10 mm in diameter and 10 mm in height. FIG. 1 shows an elevational view of a mold for slip casting. Core 1 was assembled together with upper metallic mold 2 having a cooling jacket divisible into two portions and lower disc-shaped metallic mold 3 having gate 4 in its center axis to form a metal mold for slip casting. It should be noted that the metal mold thus formed had an inside diameter of 60 mm and an inside height of 20 mm.

Secondly, a slip of silicon nitride, using, as a dispersion medium, paraffin with a melting point of 42° to 44° C. contained in a composition shown in Table 1, was heated and fluidized. The fluidized slip was cast into the metal mold for slip casting, which had been water-cooled, and was kept at a pressure of 3 kg/cm$^2$ for 2 minutes ,and a half. And then, the metal mold was disassembled, and molded body 5 with core 1 attached thereto as shown in FIG. 2, was obtained. After cutting of the portion of gate 4 attached to molded body 5, the molded body was put into a device for supercritical extraction. In the device, using carbon dioxide as extraction solvent, the molded body was kept at 40° C. and at 300 kg/cm$^2$ for 2 hours, while carbon dioxide was passed therethrough to remove paraffin and oleic acid. Subsequently, the carbon dioxide was exhausted by a two hour pressure reduction, and then, resultantly, as shown in FIG. 3, the core having disappeared and the dispersion medium having been extracted, finally molded body 6 was obtained.

TABLE 1

| | |
|---|---|
| $Si_3N_4$ | 75.4 |
| $Y_2O_3$ | 5.0 |
| $Al_2O_3$ | 1.6 |
| Paraffin | 17.8 |
| Oleic acid | 0.2 |

EXAMPLE-2

71 wt.% alumina was added to 29 wt.% granular paraffin having a melting point of 42° to 44° C. to prepare a mixture. The mixture was heated to 60° C. to become molten and then it was stirred and mixed. Thereafter, the mixture was cast into the same metal mold as used in Example-1. The metal mold was cooled and disassembled to obtain a similar core to that (core 1) shown in FIG. 1, and then, the same metallic mold for slip casting as used in Example-1 was constituted.

Subsequently, a slip of silicon nitride, using paraffin used in Example-1 as a dispersion medium, was put into the casting operation, and followed by the supercritical extraction performance. Resultantly, a finally molded body from which the dispersion medium was removed and which retained the alumina in it, was obtained. The alumina remaining was such as can be easily extracted.

What is claimed is:

1. A method for slip casting in a mold, comprising casting slip into said mold which comprises at least one part adapted to be in contact with the slip cast into said mold, said at least one part being a compact comprising a mixture of an organic matter and a powder, said organic matter being capable of being extracted by a supercritical fluid and having a melting point of 0° to 150° C. and said powders being incapable of being extracted by the supercritical fluid, and solidifying said slip to form a solidified casting; and contacting said solidified casting and said compact with a supercritical fluid to extract said organic matter from said compact whereby said compact disintegrates and thereby separates from said solidified casting.

2. The method according to claim 1, wherein said organic matter is selected from the group consisting of methyl carbonate, t-butyl alcohol, stearic acid, stearyl alcohol and paraffin.

3. The method according to claim 1, wherein said compact is formed by press forming or mold casting.

4. The method according to claim 1, wherein said compact includes a core.

5. The method according to claim 1, wherein said supercritical fluid is selected from the group consisting of ethane, ethylene, carbon dioxide, monochlorotrifluoromethane, trichloromonofluoromethane and ammonia.

6. The method according to claim 2, wherein said supercritical fluid is selected from the group consisting of ethane, ethylene, carbon dioxide, monochlorotrifluoromethane, trichloromonofluoromethane and ammonia.

7. The method according to claim 1, wherein said organic matter is paraffin and said supercritical fluid is carbon dioxide.

8. The method according to claim 7, wherein said paraffin has a melting point of about 42°-44° C.

9. The method according to claim 1, wherein said compact is a core which forms a reentrant portion in the solidified casting.

10. The method according to claim 1, wherein the powder is selected from the group consisting of metal powder and ceramic powder.

11. The method according to claim 1, wherein the powder is a metal powder having a particle size of 1 to 1,000 μm.

12. The method according to claim 1, wherein the powder is a ceramic powder having a particle size of 0.2 to 10 μm.

13. The method according to claim 1, wherein the powder is an iron alloy powder manufactured by a gas atomizing metal.

14. The method according to claim 1, wherein the powder is selected from the group consisting of silica powder and alumina powder.

15. The method according to claim 1, wherein the powder is present in an amount of 71 weight %.

16. The method according to claim 15, wherein the powder comprises alumina powder.

17. The method according to claim 1, wherein said slip comprises a metal powder or a ceramic powder dispersed in a dispersion medium.

18. The method according to claim 17, wherein the liquid dispersion medium comprises a paraffin, water or an organic solvent.

19. The method according to claim 18, wherein the liquid dispersion medium is an organic solvent selected from the group consisting of methyl carbonate, t-butyl alcohol, methyl alcohol, ethyl alcohol, butyl alcohol, hexane and benzene.

20. The method according to claim 18, wherein the liquid dispersion medium is a paraffin having a melting point of 40° to 80° C.

21. The method of claim 18, wherein the liquid dispersion medium is water and dispersed therein is a ceramic oxide.

22. The method of claim 19, wherein dispersed in the organic solvent is a ceramic oxide selected from the group consisting of alumina and zirconia and a non-oxide selected from the group consisting of silicon nitride, silicon carbide and aluminum nitride.

23. The method of claim 20, wherein dispersed in the paraffin is a ceramic oxide selected from the group consisting of alumina and zirconia and a non-oxide selected from the group consisting of silicon nitride, silicon carbide and aluminum nitride.

* * * * *